(12) United States Patent
Kahle et al.

(10) Patent No.: US 11,869,159 B2
(45) Date of Patent: Jan. 9, 2024

(54) HIGH DENSITY 3D ENVIRONMENT CAPTURE WITH GUIDED MIXED REALITY

(71) Applicant: Trimble Inc., Sunnyvale, CA (US)

(72) Inventors: Kent Kahle, Fallbrook, CA (US); Jordan Lawver, Denver, CO (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 17/825,617

(22) Filed: May 26, 2022

(65) Prior Publication Data

US 2022/0358731 A1 Nov. 10, 2022

Related U.S. Application Data

(63) Continuation of application No. 17/308,431, filed on May 5, 2021, now Pat. No. 11,373,381.

(51) Int. Cl.
*G06T 19/00* (2011.01)
*G06T 17/00* (2006.01)

(52) U.S. Cl.
CPC ............ *G06T 19/006* (2013.01); *G06T 17/00* (2013.01); *G06T 2200/08* (2013.01)

(58) Field of Classification Search
None
See application file for complete search history.

(56) References Cited

U.S. PATENT DOCUMENTS

| 10,546,427 | B2 * | 1/2020 | Frank | .................... G06T 19/003 |
| 11,373,381 | B1 | 6/2022 | Kahle et al. | |
| 2014/0210856 | A1 | 7/2014 | Finn et al. | |
| 2019/0340814 | A1 | 11/2019 | Sinclair et al. | |
| 2020/0209394 | A1 | 7/2020 | Mark et al. | |
| 2021/0019953 | A1 | 1/2021 | Pekelny et al. | |

FOREIGN PATENT DOCUMENTS

| EP | 3 246 660 A1 | 11/2017 |
| EP | 3 460 394 A1 | 3/2019 |

OTHER PUBLICATIONS

Renner et al., "Attention Guiding Techniques using Peripheral Vision and Eye Tracking for Feedback in Augmented-Reality-Based Assistance Systems", IEEE, 2017. (Year: 2017).*

(Continued)

*Primary Examiner* — Nicholas R Wilson
(74) *Attorney, Agent, or Firm* — Kilpatrick Townsend & Stockton LLP (57) ABSTRACT

A laser scanner is used with a mixed reality device to track and/or locate objects in an environment, such as a construction site. In some configurations, mixed reality is used to assist laser scanning. A collection of data points representing a point cloud can be acquired with a laser scanner. A reference frame of a mixed-reality device is aligned to the data of the point cloud. A graphic is presented on a display of the mixed-reality device. The graphic is positioned on the display in relation to the environment, based on the reference frame of the mixed-reality device being aligned to data of the point cloud. An item in the environment is tracked (e.g., a hazard or a tool). Data is provided to the mixed-reality device regarding a position of the item in the environment.

20 Claims, 7 Drawing Sheets

(56) References Cited

OTHER PUBLICATIONS

Extended European Search Report for Application No. 22171394.4-1009, dated Oct. 7, 2022, 8 pages.
Kim, S. et al., "3D Point Cloud and BIM-Based Reconstruction for Evaluation of Project by As-Planned and As-Built," Remote Sensing, vol. 12, No. 1457, published May 4, 2020, 14 pages.
Kumar, G. A. et al., "Sensor Fusion Based Pipeline Inspection for the Augmented Reality System," MDPI, Symmetry, vol. 11, No. 1325, published Oct. 22, 2019, 19 pages.
Velodyne LiDAR PUCK™, downloaded from https://www.amtechs.co.jp/product/VLP-16-PUCK.pdf, 2016, 2 pages.
U.S. Appl. No. 17/308,431 Non-Final Office Action dated Oct. 5, 2021, 23 pages.
U.S. Appl. No. 17/308,431 Notice of Allowance dated Feb. 22, 2022, 7 pages.
Office Action for European Application No. 22 171 394.4-1009, dated Oct. 31, 2023, 8 pages.

* cited by examiner

HIGH DENSITY 3D ENVIRONMENT CAPTURE WITH GUIDED MIXED REALITY

CROSS REFERENCE TO RELATED APPLICATIONS

The present application is a continuation of U.S. application Ser. No. 17/308,431, filed May 5, 2021, the contents of which are incorporated herein by reference in its entirety for all purposes. This disclosure is related to U.S. application Ser. No. 16/924,651, filed on Jul. 9, 2020, which is incorporated by reference in its entirety.

BACKGROUND

This disclosure relates in general to surveying systems and augmented reality. Surveying systems determine positions of points relative to each other and/or to the Earth. Surveying can be used in many applications by land surveyors, construction professionals, and civil engineers. Surveying often uses specialized and/or expensive equipment, such as laser levels, surveying rods, total stations, laser scanners, and GNSS (Global Navigation Satellite System) receivers.

In augmented reality, one or more virtual objects (e.g., computer-generated graphics) can be presented to a user in relation to real-world objects. Augmented reality can include a see-through display with a virtual object shown to a user on the see-through display. An example of an augmented-reality system is the Microsoft HoloLens. Another type of augmented reality is overlaying a virtual object on an image of the real world. For example, a smartphone camera is used to acquire an image of objects in the real world. The smartphone then overlays a graphic on the image of the real world while presenting the image on a screen of the smartphone. Artificial reality and mixed reality are sometimes used to refer to both augmented reality and virtual reality.

BRIEF SUMMARY

A laser scanner, such as Trimble's X7 3D laser scanner, can be used to acquire a three-dimensional point cloud of an environment. The point cloud can be used to guide an artificial-reality system in the environment.

In certain embodiments, a system comprises a scanner (e.g., a laser scanner) and an augmented-reality device. The laser scan comprises a laser configured to generate an optical beam; a beam-steering device configured to steer the optical beam; and/or a detector configured to receive light from the optical beam, after light from the optical beam is reflected from an object in an environment. The augmented-reality device is configured to provide augmented-reality to a user. The augmented-reality device comprises one or more sensors configured to acquire images of the environment; a display configured to render graphics on the display; and/or one or more processors configured to: acquire, using the laser scanner, a collection of data points representing a point cloud, wherein the point cloud is a three-dimensional point cloud; transmit data of the point cloud to the augmented-reality device; align a reference frame of the augmented-reality device to the data of the point cloud; and/or present a graphic on the display of the augmented-reality device, wherein the graphic is positioned on the display in relation to the environment based on the reference frame of the augmented-reality device being aligned to data of the point cloud. In some embodiments, the beam-steering device comprises a mirror; the mirror rotates to steer the optical beam; the laser scanner comprises an angle encoder for measuring an angle of rotation of the laser scanner; the laser scanner has a scanning field of view; the augmented-reality device has an optical field of view; the scanning field of view is wider than the optical field of view; the scanning field of view is at least twice as wide as the optical field of view; the graphic is generated from model data of a three-dimensional model; the model data is aligned with the reference frame of the augmented-reality device; the augmented-reality device is a first augmented-reality device; the system comprises a second augmented-reality device; the one or more processors are configured to transmit data of the point cloud to the second augmented-reality device; the data of the point cloud sent to the first augmented-reality device is a first portion of data; the data of the point cloud sent to the second augmented-reality device is a second portion of data; the second portion of data is different from the first portion of data; the data of the point cloud transmitted to the augmented-reality device is post-processed data from raw data of the laser scanner; the post-processed data comprises polygon data; and/or the graphic is generated from model data from a three-dimensional model, separate from the polygon data.

In certain embodiments, a method comprises acquiring, using a laser scanner, a collection of data points representing a point cloud in three-dimensional space, wherein the laser scanner comprises: a laser configured to generate an optical beam, a beam-steering device configured to steer the optical beam, and/or a detector configured to receive light from the optical beam, after light from the optical beam is reflected from an object in an environment; transmitting data of the point cloud to an augmented-reality device, wherein the augmented-reality device comprises: one or more cameras configured to acquire images of the environment, and a display configured to render graphics on the display; aligning a reference frame of the augmented-reality device to the data of the point cloud; and/or presenting a graphic on the display of the augmented-reality device, wherein the graphic is positioned on the display in relation to the environment based on the reference frame of the augmented-reality device being aligned to data of the point cloud. In some embodiments, the laser scanner has a scanning field of view; the augmented-reality device has an optical field of view; the scanning field of view is wider than the optical field of view; the scanning field of view is equal to or greater than 270 degrees; the data of the point cloud transmitted to the augmented-reality device is post-processed data from raw data of the laser scanner; the post-processed data comprises polygon data; and/or the method further comprises measuring a distance from the laser scanner to the object based on receiving light from the optical beam, after light from the optical beam is reflected from the object in the environment, having the laser scanner remain stationary by not translating the laser scanner while the laser scanner acquires the collection of data points, generating the graphic from model data of a three-dimensional model, and/or aligning the model data with the reference frame of the augmented-reality device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

This application, without limitation, relates to workflow benefits provided by an integration of a high-density LIDAR sensor (e.g., Trimble X7) with a head-mounted mixed-reality (MR) device (e.g., TrimbleXR10). The XR10 is capable of "seeing" and "understanding" its environment to provide guidance to the user on a task but not at the density or accuracy used for certain construction applications. A sensor external to the XR10 (e.g., the Trimble X7) is used to capture a high-accuracy, high-density point cloud and feed that information to the mixed-reality device (e.g., and, in essence, overwriting the device's own understanding of its environment with a higher quality input). In doing so, the mixed-reality device is capable of guiding users for tasks with greater accuracy, density, and/or scope. For example, greater accuracy is tighter measurement tolerance; greater density is more points, which equals better definition of what is being done; and greater scope is seeing farther and/or wider.

Application Examples can include:
  during prefabrication of complex assemblies, a user can receive real-time feedback on if they are installing the correct piece in the correct location, to millimeter accuracy;
  before performing high-risk actions (e.g., drilling a core hole through a deck), the user can receive guidance through an MR headset on if they are in the correct location and/or their tool is aligned properly;
  while framing for concrete column pours, users can receive guidance if the framing/rebar is in the correct location/orientation before pouring the concrete into it;
  while pouring concrete floors, users can receive guidance as to where the floor is not flat and/or where cut/fill is needed before the concrete cures;
  during installation of components, the user can receive step-by-step guidance for assembly and feedback for when the correct component is placed in the correct location; and/or
  while doing a static 3D capture of an environment, the mixed-reality device can provide guidance as to where areas may exist that are not measured, guiding the user to more efficient scan location.

Different applications have different accuracy tolerances and point density. Accuracy refers to the mixed-reality device being able to place holographic information in the correct position relative to the physical environment. Density refers to the mixed-reality device's ability to capture an understanding of the world and its current state. In some embodiments, this disclosure relates to high-density, low and high accuracy applications. An addition of an external 3D capture sensor is used to provide high-density environment data to the MR device.

Figure 1:
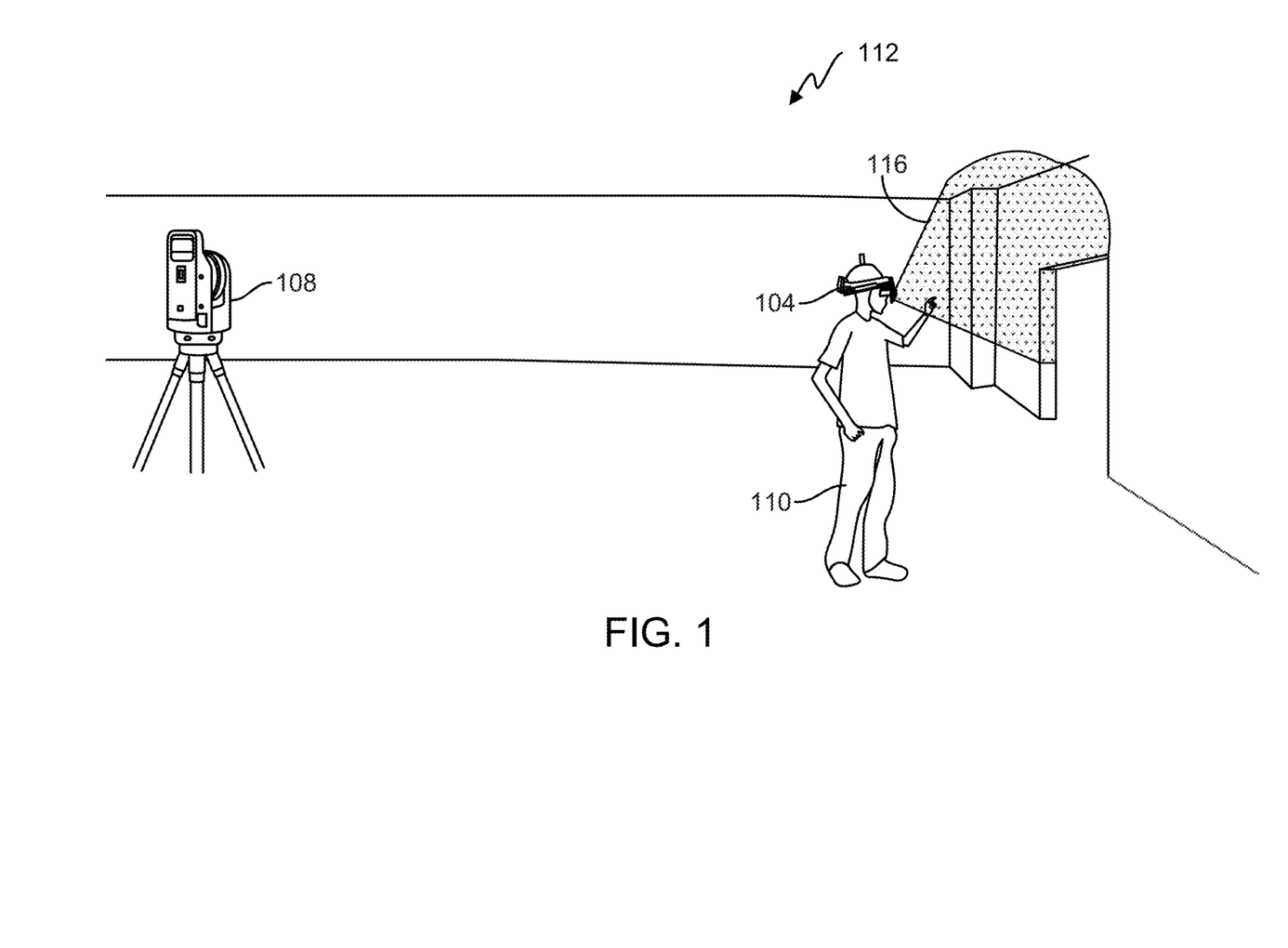
FIG. 1 depicts an embodiment of a system for a high-density, three-dimensional (3D) environment capture to guide mixed reality.

Referring first to FIG. 1, an embodiment of a system for high-density, three-dimensional (3D) environment capture to guide mixed-reality is depicted. The system comprises an augmented-reality (AR) device 104 and a scanner (e.g., laser scanner 108).

The laser scanner 108 generates a three-dimensional point cloud. For example, the laser scanner 108 comprises a laser configured to generate an optical beam, a beam-steering device configured to steer the optical beam, and a detector configured to receive light from the optical beam, after light from the optical beam is reflected from an object in an environment 112. The laser scanner 108 is configured to be stationary while acquiring the point cloud. For example, the laser scanner 108 could be positioned at a place that has previously been surveyed. In some embodiments, the laser scanner 108 is part of the base station disclosed in the '651 application (e.g., as part of a scanning total station). In some embodiments, the beam-steering device comprises a mirror to reflect the optical beam. For example, an oscillating (e.g., rotating) MEMS mirror is used to steer the optical beam. The laser scanner 108 can comprise one or more angle encoders for measuring an angle of rotation of the laser scanner 108. For example, the laser scanner 108 comprises an angle encoder for horizontal rotation and an angle encoder for vertical rotation. In some embodiments, an angle encoder comprises a stepper motor and/or a glass disc with markings. In some embodiments, the laser scanner 108 comprises one or more cameras for acquiring images (e.g., panoramic images) of the environment. The laser scanner 108 is configured to measure a distance from the laser scanner to the object (e.g., a point on the object) in the environment 112 based on receiving light from the optical beam, after light from the optical beam is reflected from the object. In some configurations, the laser scanner 108 is stationary (e.g., on a tripod). In some configurations, the laser scanner 108 is mobile (e.g., mounted on a robot).

The AR device 104 is configured to provide augmented-reality to a user 110. The AR device 104 comprises one or more sensors (e.g., one or more cameras and/or LIDAR) configured to acquire images of the environment and a display configured to render graphics on the display. The AR device 104 has a field-of-view 116.

One or more processors (e.g., in the laser scanner and/or in the AR device 104) are configured to acquire, using the laser scanner, a collection of data points representing a three-dimensional point cloud; transmit data of the point cloud to the augmented-reality device; align a reference frame of the augmented-reality device to the data of the point cloud; and present a graphic on the display of the augmented-reality device, wherein the graphic is positioned on the display in relation to the environment based on the reference frame of the augmented-reality device being aligned to data of the point cloud.

Though the AR device 104 is depicted as a wearable device, in some embodiments the AR device 104 is a mobile device (e.g., a tablet or a smartphone). In some embodiments, the laser scanner 108 is configured to be stationary (e.g., no translation but could have rotation) while the AR device 104 is moved around in the environment 112. Thus, the laser scanner 108 is separate from the AR device 104 (e.g., separate devices; separated by at least 2 feet; and/or within wireless radio range of each other).

The AR device 104 can be used to build in real-time. For example, a model could be built using a 3D program, such as SketchUp. The model, or a portion of the model, could be overlaid in a display of the AR device 104, so the user could see how an object is to be built and/or arranged in an environment. In another example, a digital twin could be used to guide someone (e.g., step-by-step) how to do a task.

In some embodiments, an advantage is the ability to present graphics to a user in real time, in accurate placement within an environment. Some current AR devices rely on internal sensors for information about six degrees of freedom (6DOF). However, details about the environment can be imprecise and/or inaccurate. For example, many cameras on an AR device are wide-angle cameras. Wide-angle cameras do not provide as much detail about object placement in an environment when the object is far away from the camera. For example, some AR devices do not have much detail beyond five feet. A size of an AR device can make it difficult for obtaining precise information about the environment. For example, a wearable device is often desired to be small and light, using solid-state components. Additionally, high-computation computing can generate heat, which could be uncomfortable to a user with a wearable AR device. Thus, it can be beneficial to use a separate device, such as a laser scanner with a rotating mirror and/or rotation sensors, to acquire detailed (e.g., higher precision) information about the environment.

Figure 2:
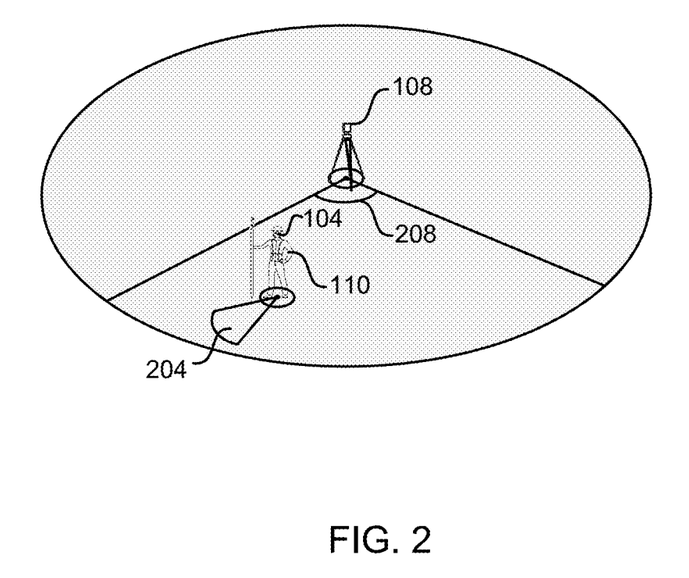
FIG. 2 depicts an embodiment a scanning field of view of a 3D scanner being wider than an optical field of view of a mixed-reality (MR) system.

FIG. 2 depicts an embodiment of a scanning field of view of the laser scanner 108 being wider than an optical field of view of the AR device 104. The AR device 104 has an optical field-of-view (FOV) 204 (e.g., measured horizontally). The laser scanner 108 has scanning field-of-view (FOV) 208 (e.g., measured horizontally). The scanning FOV 208 is wider than the optical FOV 204. In some embodiments, the scanning FOV 208 is equal to or greater than 1.25, 1.5, 1.75, 2, 3 and/or 4 times as wide as the optical FOV 204. For example, the scanning FOV 208, measured horizontally, is equal to or greater than 45, 60, 90, 120, 180, 270, 300, or 360 degrees (e.g., by using beam steering). The optical FOV 204 of the AR device 104 can be equal to or greater than 70, 90, 120, 150, or 200 degrees and/or equal to or less than 210 degrees. The orientation of the AR device 104 is not confined to the same field of view of the laser scanner. The optical FOV 204 is a field-of-view presented to the user 110 on the AR device 104 (e.g., up to 210 degrees for a wearable device and up to 180 degrees for a mobile device). In some embodiments, the scanning FOV 208 is equal to or greater than 250, 270, or 300 degrees to be greater and/or much greater than the optical FOV 204 of the AR device 104, when embodiment where the AR device 104 is a wearable device. The laser scanner 108 can also provide scale to the AR device 104.

Figure 3:
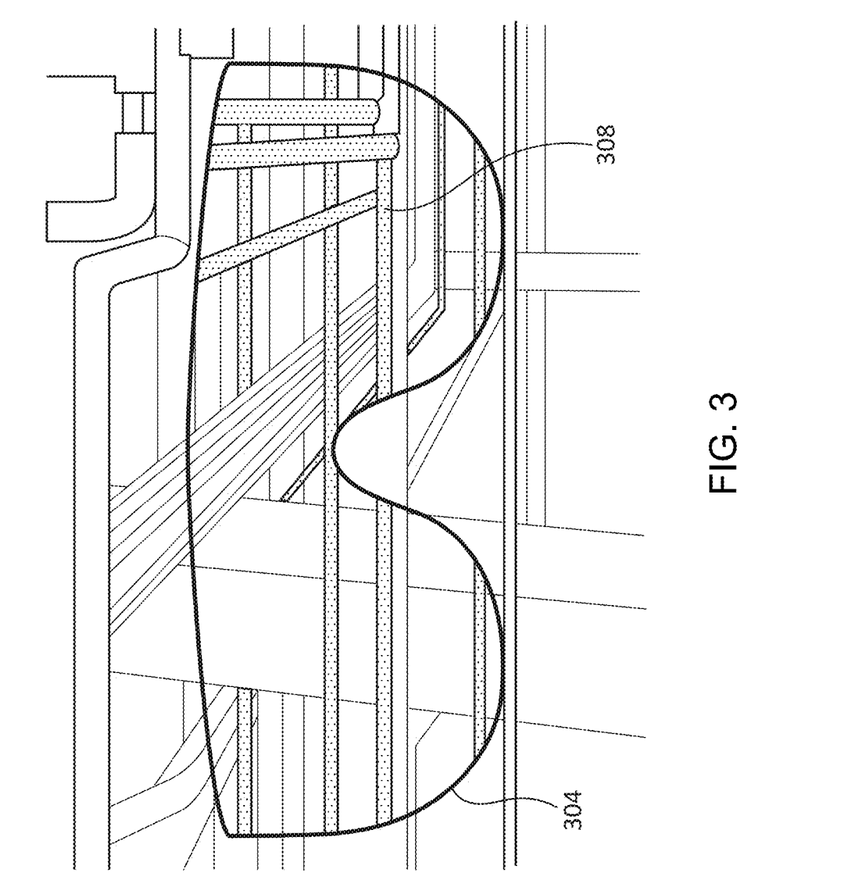
FIG. 3 is an embodiment of a 3D overlay in an augmented-reality (AR) system.

FIG. 3 is an embodiment of a 3D overlay in an augmented-reality (AR) device. FIG. 3 depicts a display 304 of an AR device. A graphic 308 is shown as an overlay in the display 304 of the AR device. The graphic is generated from model data of a three-dimensional model (e.g., a CAD drawing). The model data is aligned with the reference frame of the AR device, so that the graphic 308 is depicted in relation to the environment. For example, the graphic 308 is an image of a water pipe or electrical line to be placed at a construction site. In some embodiments, the AR device can enable the user can "see" through walls or obstacles (e.g., to see wire locations in a wall).

Figure 4:
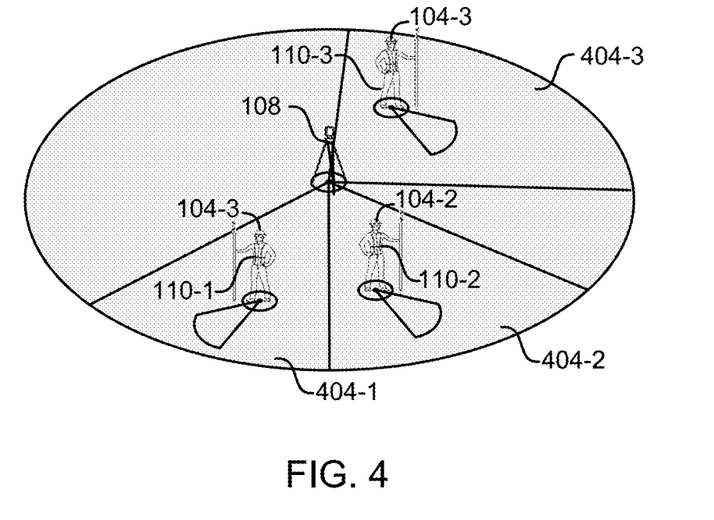
FIG. 4 is an embodiment of a 3D scanner supporting multiple AR systems.

FIG. 4 is an embodiment of a 3D scanner supporting multiple AR systems. In the embodiment shown, the laser scanner 108 is supporting three users 110. A first user 110-1 has a first AR device 104-1; a second user 110-2 has a second AR device 104-2; and a third user 110-3 has a third AR device 104-3. The laser scanner 108 is configured to transmit data of the point cloud to the first AR device 104-1, to the second AR device 104-2, and to the third AR device 104-3.

Transmitting data from the laser scanner 108 to the AR device 104 can be bandwidth intensive. Accordingly, in some embodiments, only a portion of the point cloud data from the laser scanner 108 is transmitted to the AR device 104. A location and/or an orientation of a user 110 is ascertained. For example, information about the location and/or the orientation of a user is transmitted from the AR device 104 to the laser scanner 108 (or to a base station that incorporates the laser scanner 108). Information about the location and/or the orientation of the user can be ascertained as described in the '651 application.

A first portion of data of the point cloud is transmitted to the first AR device 104-1 corresponding to a first portion 404-1 of the point cloud. A second portion of data of the point cloud is transmitted to the second AR device 104-2 corresponding to a second portion 404-2 of the point cloud. A third portion of the data of the point cloud is transmitted to the third AR device 104-3 corresponding to a third portion 404-3 of the point cloud. Data sent to the first AR device 104-1 is different from the data sent to the second AR device 104-2, which is different from the data sent to the third AR device 104-3. In some embodiments, data of the point cloud is divided into equal-sized portions 404 (e.g., quadrants), and data of the point cloud corresponding to the portion(s) 404 of the point cloud that are within a field-of-view the AR device 104, or likely to be within the field-of-view of the AR device 104 (e.g., based on trajectory movement of the AR device 104), is transmitted to the AR device 104. In some embodiments, the portion 404 of the point cloud sent to the AR device 104 is dynamically changed. For example, a position and/or orientation of the AR device 104 is tracked, and the AR device 104 receives a set amount of data based on the position and/or orientation of the AR device 104 (e.g., at a first time, the AR device 104 receives data of the point cloud corresponding to angles 49-139 degrees (a first 90 degree slice); and, at a second time, the AR device 104 receives data of the point cloud corresponding to angles 205-295 degrees (a second 90 degree slice)). In some embodiments, data sent to the first AR device 104-1 could have some overlap with data sent to the second AR device 104-2.

In some configurations, point-cloud data is processed before sending data of the point cloud to the AR device 104. For example, post-processed data could comprise polygon data instead of raw data of the point cloud. In some embodiments, a partial view of data is sent from the laser scanner 108 to the AR device 104. For example, closer objects (e.g., represented by polygons) to the AR device 104 are transmitted first. In some embodiments, data of the point cloud and/or the 3D model is sent to the AR device 104 as an image. For example, positioning data is sent to the AR device 104 periodically (e.g., every 1, 5, 10, or 30 seconds), and images are sent to the AR device 104 more frequently (e.g., 5, 10, 30, or 60 times per second).

Figure 5:
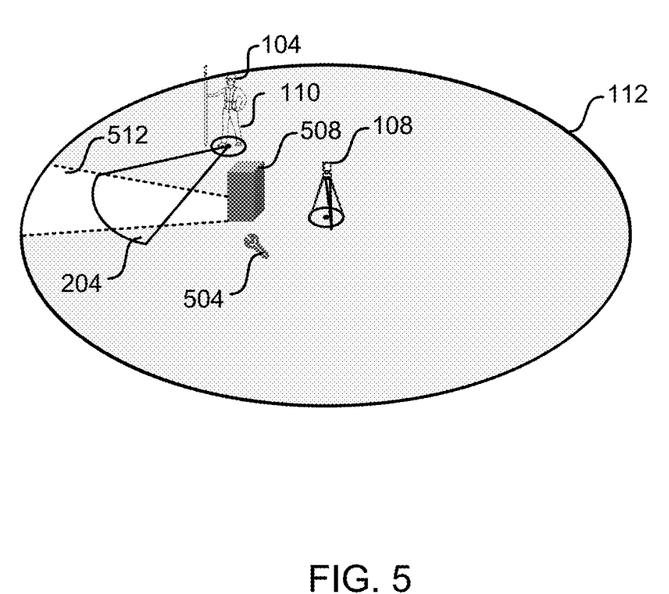
FIG. 5 illustrates additional uses of an embodiment of a system for high-density, 3D environment capture to guide mixed reality.

FIG. 5 illustrates additional uses of an embodiment of a system for high-density, 3D environment capture to guide mixed-reality. For example, a user 110 could place a tool 504 in the environment 112, and the system could track the location of the tool 504 within the environment 112. Thus the user 110 could be directed to a tool that is not in the field of view 204 of the AR device 104.

In another embodiments, the AR device 104 can assist in data gathering of the laser scanner 108. For example, a point cloud could be transmitted to the AR device 104, and the user could check for missing data points of the point cloud. For example, an obstacle 508 could block the laser scanner 108 from generating a 3D point cloud on a surface (e.g., floor, wall, and/or ceiling) of the environment 112. Point cloud data could be overlaid in a display of the AR device 104 (e.g., as red dots). A user observing the floor could observe that there are areas of the floor missing red dots (e.g., in area 512) and reposition the laser scanner 108, so that the laser scanner 108 gathers data of the area 512. Observing in real-time, or near real-time, data acquired by the laser scanner 108 can be helpful, especially when a laser scanner 108 is moved to multiple locations because of the size of the environment 112 and/or because of several obstacles 508 in the environment 112. Thus, the AR device 104 can be used in selecting placement of the laser scanner 108 during data acquisition by the laser scanner 108.

In some embodiments, the laser scanner 108 is helpful while the AR device 104 is in a feature-poor environment. For example, environment 112 could include a concrete foundation of a large building on a cloudy day. The laser scanner 108 can provide a point cloud in relation to the concrete foundation, even though the AR device 104 might have a hard time tracking the user's location and/or orientation while the user 110 is on the concrete. Data of the point cloud can provide high precision to the AR device 104 for providing augmented-reality of a building to the user 110. For example, the user 110 can be on a virtual walk-through of the building, even though there is only a foundation. Layers can be turned off and on to assist the user. For example, the user could turn on a "plumbing" or "electrical" layer and see the path of pipes and/or electrical wires routed in the virtual building. This can be helpful to visualize a project before, during, and/or after construction.

Data from the laser scanner 108 can be used to help the user 110 safely navigate through the environment 112 (e.g., to warn of hazards/dangers and/or to help the user find something, such as a direction or a tool). For example, before a user drilled a hole through a wall, the system could warn the user that an electrical wire, plumbing, or other features are behind the wall where the user is about to drill. In another example, the user 110 uses a virtual-reality device (e.g., light from the environment 112 is blocked by the virtual-reality device), and the laser scanner helps the user avoid running into obstacles, allowing a user 110 to operate virtual reality in many different types of environments.

Figure 6:
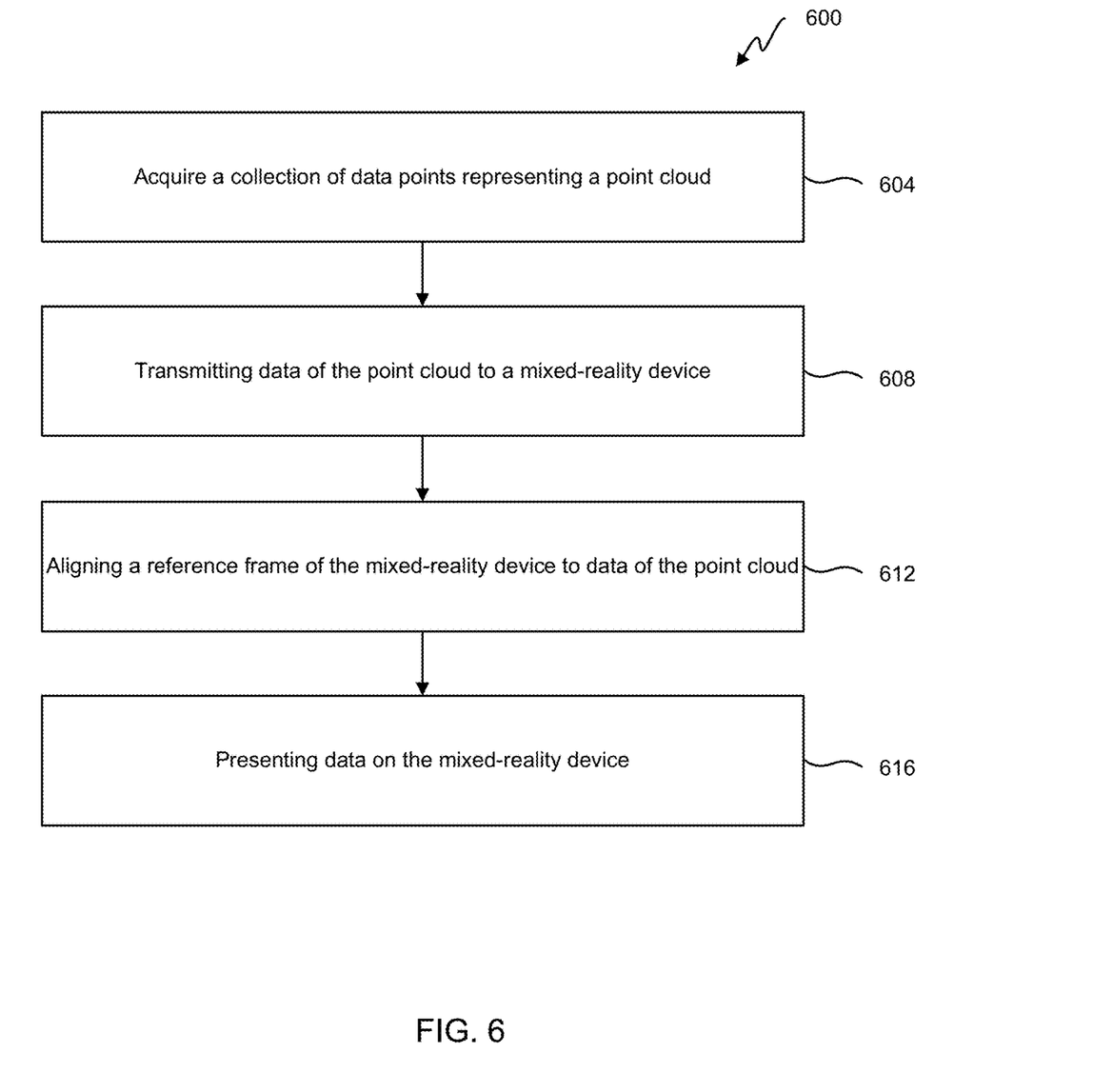
FIG. 6 illustrates a flowchart of an embodiment of a process for using a laser scanner to guide mixed reality.

In FIG. 6, a flowchart of an embodiment of a process 600 for using a laser scanner to guide mixed reality.

Acquire a Point Cloud

Process 600 begins in step 604 with capturing a point cloud with a 3D laser scanner. For example, the laser scanner 108 in FIG. 1 is used to acquire a collection of data points representing the three-dimensional point cloud. In some embodiments, the laser scanner comprises a laser configured to generate an optical beam, a beam-steering device configured to steer the optical beam, and/or a detector configured to receive light from the optical beam, after light from the optical beam is reflected from an object in an environment.

In some configuration scenarios, the scanner location is referenced to a geometry of the environment (e.g., to the geometry of a room or a location) before the scanning. In some configurations, the scanner is not in a previously known location and uses contents of its capture to reference to the mixed reality device.

Some embodiments of scanning includes using fixed scanner on a tripod (e.g., Trimble X7, TX8, or SX10); scanning in a dynamically changing environment (e.g., a construction site); using a roving, mobile, robotic, handheld, or backpack scanner (e.g., Trimble X7 mounted on Boston Dynamic's robotic dog, Spot); capturing while constantly moving (e.g., mobile mapping); moving the scanner to locations, stopping, scanning, and then moving to another location; and/or using a scanner permanently mounted to something in the environment. In some configurations, a static environment is preferred (e.g., a manufacturing facility). For a moving scanner, features can be correlated and/or targets used (e.g., to stitch together data about the environment).

Transmitting Data of the Point Cloud to a Mixed-Reality Device

In step 608, data of the point cloud is transmitted to a mixed-reality device (e.g., the augmented-reality device 104 of FIG. 1). The mixed-reality device comprises one or more cameras configured to acquire images of the environment, and a display configured to render graphics on the display.

In some configurations data, a step before transmitting data of the point cloud includes preparing data before transfer. Scanners rapidly capture an immense amount of data. For one or more reasons, it may be helpful to preprocess the data before transferring it to the mixed-reality device. The full amount of scan data (e.g., raw data) likely cannot be transferred fast enough to be usable by some applications and/or devices, bandwidth can be limited (e.g., at a construction site), and/or even if transferred, not all of the data could be loaded on the mixed-reality device at once.

Preprocessing data (e.g., processing raw data before transferring data of the point cloud to the MR device) can include:

Decimation-removing a percentage portion of the raw data while maintaining enough data to perform requested actions;

Proximity-transferring only data that is being captured within a proximity of the user wearing the mixed-reality device (defined automatically or manually);

Cross-section/windowing-transferring only data that is within the field-of-view of the user wearing the mixed-reality device (e.g., at the time of transfer); and/or Insight based-rather than transferring the raw scan data, algorithms are run before transfer with sharing only the algorithmic output; for example, if a user is interested in a "progress complete" workflow whereby the scanner will show discrepancies between the current as-built and the design, this comparison could be done before transfer with only the discrepancy delta being shared (e.g., the pipe was installed three inches too far to the left).

Pre-processing prior to transfer can be done in a number of locations, including a built-in processing capabilities of the scanner; on a tablet or computer connected to the scanner (e.g., hardwired or wireless); on a "black box" processing unit (e.g., hardwired or wireless); and/or in the cloud (e.g., on a local server or WiFi or internet connected server).

Data of the point cloud (e.g., raw and/or preprocessed data) can be transferred to the mixed-reality device in various ways, including WiFi (P2P or internet connected), cellular, radio bridge, LORAN, Bluetooth, and/or a wired connection between the scanner and the mixed-reality device, with or without a middle processing component (e.g., black box mentioned previously above).

A speed at which transfer takes place can depend on the application. An application like guided prefabrication assembly may use near instant communication to provide feedback on micro-adjustments to be made (e.g., worker is assembling one specific component and needs to know if he/she is assembling the component correctly). An application like concrete floor pouring may use updated data every minute or less for more macro-level cut/fill adjustments (e.g., if there's a lot of concrete to pour and ground to cover and they have 30 minutes until the concrete cures). In some embodiments the data transfer rate is variable (e.g., more updates at the beginning of a concrete pour and less updates as the concrete dries).

There will likely be a trade-off correlation between an amount of data and the rate at which it is received. An MR device receiving real-time feedback likely only needs the data for one small focus area, whereas a user looking for a larger amount of data (e.g., the cut/fill of an entire concrete pour) is likely okay waiting a short time for it.

Aligning Data of the Point Cloud with the Mixed-Reality Device

In step 612, a reference frame of the mixed-reality device is aligned with data of the point cloud. Aligning data from a scanner's reference frame into that of the MR device can be done in a number of ways, some of which are low accuracy and others are high accuracy.

After scan data is captured, processed, and/or transferred, it can be presented to a user of the mixed-reality device as an overlay (e.g., on an image of a scene presented on a display of a mobile device or presented on a see-through display of a head-mounted display, wherein the overlay is an "overlay" of natural light transmitted through the see-through display) to the user of the mixed-reality device in an accurate digital:physical correlated location.

In some embodiments, GPS is used to help coordinate reference frames. A GPS unit in a AR device, a GPS unit in the laser scanner, or both can be used. In some embodiments, the laser scanner is placed at a location and GPS of the location is marked (e.g., using a mobile device application). Some options for coordinating reference frames are described in the '651 application (e.g., using a laser spot).

A number of options exist for transforming this data between the two coordinate systems (scanner and mixed-reality device) listed below in general from highest accuracy to lowest accuracy. It should be noted that just because something is low accuracy does not mean it is not useful; in some cases, it may be a more robust and/or cost-effective approach that is still sufficient for the specific application than a more accurate option. Examples of options are listed below. Several of these options are further described in further detail in the '651 application.

External tracking of the mixed-reality device. A total station, established within the same reference frame as the scanner, tracks a prism or target on the mixed-reality device and shares that information to the device. A combined scanner/total station instrument performs both actions simultaneously, scanning the environment while also tracking a target or prism on the mixed-reality device.

Object detection of mixed-reality device from scan data. An algorithm searches through the 3D scan data in real-time. Given a known 3D classification of the mixed-reality device, the algorithm looks for and identifies the mixed-reality device in the scene and calculates 6DOF of the mixed-reality device relative to the scanner location, and then feeds this data to the mixed-reality device. In some embodiments, the scanner locates the mixed-reality device using photogrammetry from onboard mono or stereo camera(s).

Scanner and mixed-reality device align to a common reference. Using onboard sensors (cameras, depth sensors, LIDAR), the scanner and mixed-reality device identify and track common points (e.g., targets), lines (e.g., wall edges), and/or objects. The scanner and the mixed-reality device use the common reference points to align to a common reference frame.

Identifiers in the scanner reference frame are tracked by the mixed-reality device. Identifiers, such as control point targets, are placed over known locations in the same reference frame (e.g., site coordinates) as the scanner. This can be done by aligning the scanner and markers both to an existing coordinate system or by scanning the markers with the scanner itself. The mixed-reality device then tracks the markers with its onboard cameras and calculates its 6DOF relative to the marker/scanner coordinate system.

External projector referenced to scanner's coordinate system. Similar to the previous paragraph, the mixed-reality device can track known markers (e.g., targets and/or patterns) whose location is known in the same reference frame as the scanner. In some embodiments, these markers are projected onto the environment digitally by an external projection system (e.g., that itself is also aligned to the same reference system as the scanner).

3D mesh/point cloud alignment. The mixed-reality device captures a 3D mesh or point cloud of the environment (e.g., simultaneously with the laser scanner). Upon receiving the data from the laser scanner, the mixed-reality device matches its own mesh with the inbound one and aligns the two together, thus aligning itself to the reference frame of the scanner.

XR10 tracking scanner. The mixed-reality device, using its onboard sensors (cameras, depth sensors, etc.), tracks the location of the scanner using markers attached to the scanner or object detection algorithms. It uses photogrammetry to then calculate its own 6DOF relative to the scanner's reference frame.

Scan to BIM comparison. A digital design model of the environment is loaded in the mixed-reality device. Upon receiving scan data from the laser scanner, the mixed-reality device compares the input to the design model, correlating them together and thus aligning the scan data to the mixed-reality digital environment.

Mixed-reality device self-correcting mode. In this scenario, the mixed-reality device does not receive real-time 6DOF updates that help with accuracy, rather updates that help with precision. The mixed-reality device could be first aligned to the scanner's reference frame (e.g., by scanning a marker). It can then continue to self-correct its own SLAM algorithm by using things like spatial anchors or world locking tools. This helps to correct for drift away from an original known 6DOF, without referencing back to the original connection to that reference system.

Mixed-reality device autonomous mode. In this scenario, the mixed-reality device does not receive real-time 6DOF updates that help with accuracy or precision. An initial alignment is done to align the device to the scanner's reference frame (e.g., scanning a marker). After the first scan, the device relies only on its own internal SLAM algorithms to maintain correlation to the original 6DOF calculation, which could drift over time and/or distance.

Visualize Data on the Mixed-Reality Device

In step 616, data is presented on the mixed-reality device. For example, a graphic is presented on the display of the mixed-reality device (e.g., as an overlay). The graphic is positioned on the display in relation to the environment based on the reference frame of the mixed-reality device being aligned to data of the point cloud.

A type of data transferred (and/or preprocessed) from the scanner to be displayed by the mixed-reality device can vary based on an application. Types of data can include:
- 3D overlaid design (BIM) data. Scan data can be used to occlude digital data behind a physical feature in the environment;
- Raw point cloud data as captured by the laser scanner, decimated data, cross-sectioned data, colorized data (e.g., based on various criteria);
- Mesh/polygonal data, stitched together from raw point cloud data;
- Discrepancy maps (e.g., areas where differences exist between as-built captured from the laser scanner and a digital model);
- Contour/cut-fill maps, similar to a discrepancy map, showing a difference between what exists (as-built) and what should be (design);
- Linear measurements, area, and/or volume calculations;
- Differential measurements (e.g., distance between as-built and plan for an incorrectly installed assembly; progress complete % based on volume calculation between as-built and design);
- 3D/2D overlaid instructions and/or sequenced guidance;
- Overlaid RFI's/ToDos instructing work to be done, authored automatically (by calculation) and/or by other workers;
- Images captured by the scanner (or other sensors) and relayed to the mixed-reality device; and/or
- Remote support (e.g., video/audio call able to annotate over the mixed-reality user's environment).

Whether or not data has been preprocessed prior to transfer from the scanner, the mixed-reality device can do its own preprocessing to further refine to the information used/needed. Optimization what data is visualized can be based on:
- User manual settings/adjustments, such as cross-section, layer selection, model selection, and/or type of data needed for a task;
- Where the user is looking (e.g., the user doesn't need to load data not in their current FOV);
- How far the data is from the user (e.g., closer objects are likely more important to see and are thus prioritized);
- An area or volume of the data (e.g., larger objects are likely more important to prioritize);
- A current task to be completed (e.g., a user sees only what he is working on at the moment); and/or
- A persona of the user (e.g., plumbers are to see plumbing data; electricians are to see electrical data, etc.).

Figure 7:
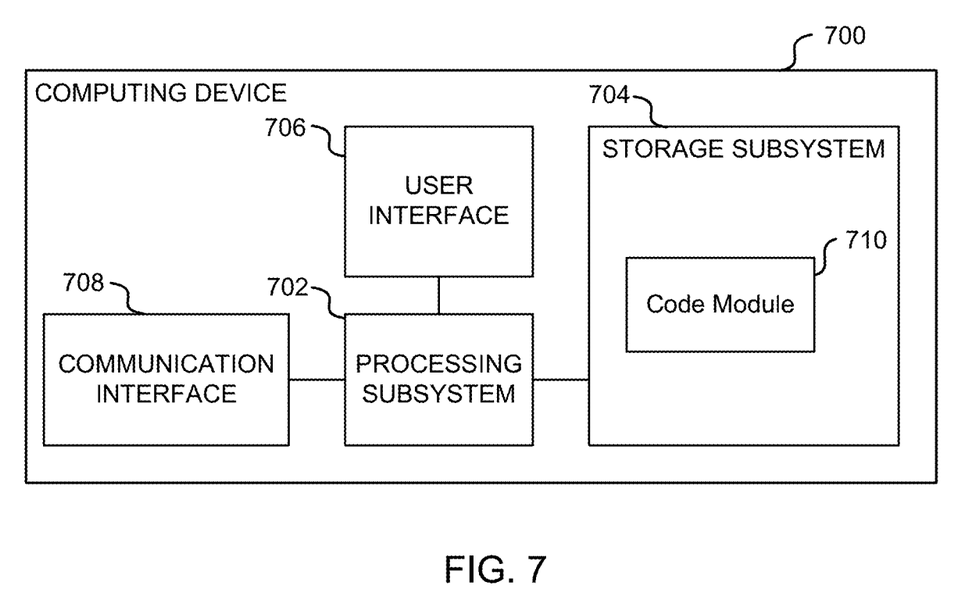
FIG. 7 depicts a block diagram of an embodiment of a computer system.

FIG. 7 is a simplified block diagram of a computing device 700. Computing device 700 can implement some or all functions, behaviors, and/or capabilities described above that would use electronic storage or processing, as well as other functions, behaviors, or capabilities not expressly described. Computing device 700 includes a processing subsystem 702, a storage subsystem 704, a user interface 706, and/or a communication interface 708. Computing device 700 can also include other components (not explicitly shown) such as a battery, power controllers, and other components operable to provide various enhanced capabilities. In various embodiments, computing device 700 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 704 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 704 can store one or more applications and/or operating system programs to be executed by processing subsystem 702, including programs to implement some or all operations described above that would be performed using a computer. For example, storage subsystem 704 can store one or more code modules 710 for implementing one or more method steps described above.

A firmware and/or software implementation may be implemented with modules (e.g., procedures, functions, and so on). A machine-readable medium tangibly embodying instructions may be used in implementing methodologies described herein. Code modules 710 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices, and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium, such as a storage medium. A code segment (e.g., code module 710) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 710 may comprise sets of instructions (codes) embodied on a computer-readable medium that directs a processor of a computing device 700 to perform corresponding actions. The instructions may be configured to run in sequential order, in parallel (such as under different processing threads), or in a combination thereof. After loading a code module 710 on a general purpose computer system, the general purpose computer is transformed into a special purpose computer system.

Computer programs incorporating various features described herein (e.g., in one or more code modules 710) may be encoded and stored on various computer-readable storage media. Computer-readable media encoded with the program code may be packaged with a compatible electronic device, or the program code may be provided separately from electronic devices (e.g., via Internet download or as a separately packaged computer-readable storage medium). Storage subsystem 704 can also store information useful for establishing network connections using the communication interface 708.

User interface 706 can include input devices (e.g., touch pad, touch screen, scroll wheel, click wheel, dial, button, switch, keypad, microphone, sensor(s) (e.g., to identify and/or track user motions and/or gestures, such as hand tracking or an air tap), etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 706 to invoke the functionality of computing device 700 and can view and/or hear output from computing device 700 via output devices of user interface 706. For some embodiments, the user interface 706 might not be present (e.g., for a process using an ASIC).

Processing subsystem 702 can be implemented as one or more processors (e.g., integrated circuits, one or more single-core or multi-core microprocessors, microcontrollers, central processing unit, graphics processing unit, etc.). In operation, processing subsystem 702 can control the operation of computing device 700. In some embodiments, processing subsystem 702 can execute a variety of programs in response to program code and can maintain multiple concurrently executing programs or processes. At a given time, some or all of a program code to be executed can reside in processing subsystem 702 and/or in storage media, such as storage subsystem 704. Through programming, processing subsystem 702 can provide various functionality for computing device 700. Processing subsystem 702 can also execute other programs to control other functions of computing device 700, including programs that may be stored in storage subsystem 704.

Communication interface 708 can provide voice and/or data communication capability for computing device 700. In some embodiments, communication interface 708 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 708 can provide wired connectivity (e.g., universal serial bus, Ethernet, universal asynchronous receiver/transmitter, etc.) in addition to, or in lieu of, a wireless interface. Communication interface 708 can be implemented using a combination of hardware (e.g., driver circuits, antennas, modulators/demodulators, encoders/decoders, and other analog and/or digital signal processing circuits) and software components. In some embodiments, communication interface 708 can support multiple communication channels concurrently. In some embodiments, the communication interface 708 is not used.

It will be appreciated that computing device 700 is illustrative and that variations and modifications are possible. A computing device can have various functionality not specifically described (e.g., voice communication via cellular telephone networks) and can include components appropriate to such functionality.

Further, while the computing device 700 is described with reference to particular blocks, it is to be understood that these blocks are defined for convenience of description and are not intended to imply a particular physical arrangement of component parts. For example, the processing subsystem 702, the storage subsystem 704, the user interface 706, and/or the communication interface 708 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 700.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system comprising:
   a laser scanner;
   a mixed-reality device comprising a display; and
   one or more processors configured to:
   acquire, using the laser scanner, a collection of data points representing a point cloud, wherein the point cloud is a three-dimensional point cloud;
   align a reference frame of the mixed-reality device to the data of the point cloud;
   present a graphic on the display of the mixed-reality device, wherein the graphic is positioned on the display in relation to an environment based on the reference frame of the mixed-reality device being aligned to data of the point cloud;
   track an item in the environment; and
   provide coordinate data from a base station to the mixed-reality device regarding a position of the item in the environment while the item is outside a field of view of the mixed-reality device.

2. The system of claim 1, wherein:
   the laser scanner is part of the base station; and
   the base station is a robotic total station.

3. The system of claim 1, wherein the laser scanner is part of the base station.

4. A method comprising:
   acquiring, using a laser scanner, a collection of data points representing a point cloud, wherein the point cloud is a three-dimensional point cloud;
   aligning a reference frame of a mixed-reality device to the data of the point cloud;
   presenting a graphic on a display of the mixed-reality device, wherein the graphic is positioned on the display in relation to an environment based on the reference frame of the mixed-reality device being aligned to data of the point cloud;
   tracking an item in the environment; and
   providing coordinate data from a base station to the mixed-reality device regarding a position of the item in the environment while the item is outside a field of view of the mixed-reality device.

5. The method of claim 4, further comprising tracking the mixed-reality device within the environment using a sensing device separate from the mixed-reality device.

6. The method of claim 4, wherein the base station comprises a total station, and the total station is used to track the item in the environment.

7. The method of claim 4, wherein the item is a tool outside the field of view of the mixed-reality device, and the method further comprises directing a user of the mixed-reality device to the tool.

8. The method of claim 4, wherein the item is an obstacle or hazard; and the mixed-reality device is configured to warn a user of the mixed-reality device of the obstacle or hazard.

9. The method of claim 8, wherein the mixed-reality device is a virtual-reality device, and light from the environment is blocked by the virtual-reality device.

10. The method of claim 8, wherein the obstacle or hazard is in a wall.

11. The method of claim 8, wherein the obstacle or hazard is existing electrical or plumbing in a wall.

12. The method of claim 8, further comprising transmitting data of the point cloud to the mixed-reality device.

13. A method comprising:
    positioning a laser scanner at a first location in an environment;
    acquiring, using the laser scanner, a collection of data points representing a point cloud, wherein:
    the point cloud is a three-dimensional point cloud;
    the point cloud is missing data of a surface in the environment, based on an obstacle between the laser scanner and the surface;
    transmitting data of the point cloud to a mixed-reality device;
    presenting data of the point cloud on the mixed-reality device;
    positioning the laser scanner at a second location, after presenting the data of the point cloud on the mixed-reality device and an identification that the point cloud is missing data of the surface, wherein the laser scanner is a base station that is separate from the mixed-reality device; and
    scanning the surface with the laser scanner at the second location.

14. The method of claim 13, wherein data of the point cloud is presented on the mixed-reality device as dots.

15. The method of claim 13, wherein:
    data of the point cloud is presented as an overlay on an augmented-reality display; and the overlay shows to a user of the mixed-reality device an area scanned by the laser scanner, such that the user can identify an area of the surface that was not scanned by the laser scanner.

16. The method of claim 13, wherein:

the obstacle is a first obstacle; and the method further comprises positioning the laser scanner at a third location to avoid a second obstacle.

17. The method of claim 13, wherein data of the point cloud is presented in real time to a user.

18. The method of claim 13, wherein a user positions the laser scanner at the second location.

19. The method of claim 13, further comprising aligning a reference frame of the mixed-reality device to the data of the point cloud.

20. The method of claim 19, further comprising presenting a graphic on a display of the mixed-reality device, wherein the graphic is positioned on the display in relation to the environment based on the reference frame of the mixed-reality device being aligned to data of the point cloud.

* * * * *